(12) United States Patent
Sutardja et al.

(10) Patent No.: US 8,937,435 B1
(45) Date of Patent: Jan. 20, 2015

(54) DIODE BRIDGE

(71) Applicant: Marvell International Ltd., Hamilton (BM)

(72) Inventors: Sehat Sutardja, Los Altos Hills, CA (US); Wanfeng Zhang, Palo Alto, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/011,253

(22) Filed: Aug. 27, 2013

Related U.S. Application Data

(60) Provisional application No. 61/693,649, filed on Aug. 27, 2012.

(51) Int. Cl.
*H05B 37/02* (2006.01)

(52) U.S. Cl.
CPC .................................... *H05B 37/02* (2013.01)
USPC ............................ 315/219; 315/224; 315/308

(58) Field of Classification Search
USPC ...... 315/291, 307, 308, 219, 209 R, 224, 276
See application file for complete search history.

(56) References Cited

U.S. PATENT DOCUMENTS

| | | | | |
|---|---|---|---|---|
| 6,774,579 B2 * | 8/2004 | Abe | ............................... | 315/219 |
| 2012/0025736 A1 * | 2/2012 | Singh et al. | ................... | 315/307 |
| 2012/0319610 A1 * | 12/2012 | Yoshinaga | .................... | 315/210 |

* cited by examiner

*Primary Examiner* — David H Vu

(57) ABSTRACT

Aspects of the disclosure provide a circuit that includes a first circuit, a second circuit and a bridge circuit. The first circuit is coupled to a magnetic component to receive electric energy transferred via the magnetic component and thus configured to store the electric energy and generate a supply voltage. The second circuit is also coupled to the magnetic component. The second circuit is switchable and is configured to deplete a portion of the electric energy when the second circuit is switched on. The bridge circuit is coupled between the first circuit and the second circuit to provide a charge flow path when the second circuit is switched off.

20 Claims, 3 Drawing Sheets

DIODE BRIDGE

INCORPORATION BY REFERENCE

This present disclosure claims the benefit of U.S. Provisional Application No. 61/693,649, "DIODE BRIDGE FOR CHARGE BALANCE AND VOLTAGE SPIKE CLAMPING" filed on Aug. 27, 2012, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Light emitting diode (LED) lighting devices provide the advantages of low power consumption and long service life. Thus, LED lighting devices may be used as general lighting equipment to replace, for example, fluorescent lamps, bulbs, halogen lamps, and the like.

SUMMARY

Aspects of the disclosure provide a circuit that includes a first circuit, a second circuit and a bridge circuit. The first circuit is coupled to a magnetic component to receive electric energy transferred via the magnetic component and is configured to store the electric energy and generate a supply voltage. The second circuit is also coupled to the magnetic component. The second circuit is switchable and is configured to deplete a portion of the electric energy when the second circuit is switched on. The bridge circuit is coupled between the first circuit and the second circuit to provide a charge flow path when the second circuit is switched off.

According to an aspect of the disclosure, the bridge circuit includes a diode coupled between the first circuit and the second circuit to clamp a voltage on the second circuit. The first circuit includes a capacitive component to store the electric energy and generate the supply voltage for a control circuit. In an example, the capacitance of the capacitive component is about 10 µF or above. The second circuit includes a switch component, such as one or more transistors.

In an embodiment, the magnetic component is a transformer. The first circuit and the second circuit are coupled to a secondary winding of the transformer, the transformer transfers the electric energy from an AC power supply coupled to a primary winding of the transformer. The circuit includes a third circuit coupled to another secondary winding of the transformer to receive the electric energy and drive a load device.

Aspects of the disclosure provide a method. The method includes receiving and storing, by a first circuit coupled with a magnetic component, electric energy transferred via the magnetic component, depleting, by a second circuit coupled with the magnetic component, a portion of the electric energy when the second circuit is switched on, and providing a charge flow path between the first circuit and the second circuit when the second circuit is switched off.

Aspects of the disclosure also provide an apparatus that includes a magnetic component, an output circuit, a first circuit, a second circuit and a bridge circuit. The magnetic component is configured to transfer electric energy from an energy source to circuits in the apparatus. The output circuit is coupled to the magnetic component to receive the electric energy and drive an output device. The first circuit is coupled to the magnetic component to receive and store the electric energy. The second circuit is coupled to the magnetic component to deplete a portion of the electric energy when the second circuit is switched on. The bridge circuit is coupled between the first circuit and the second circuit to provide a charge flow path when the second receiving circuit is switched off.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
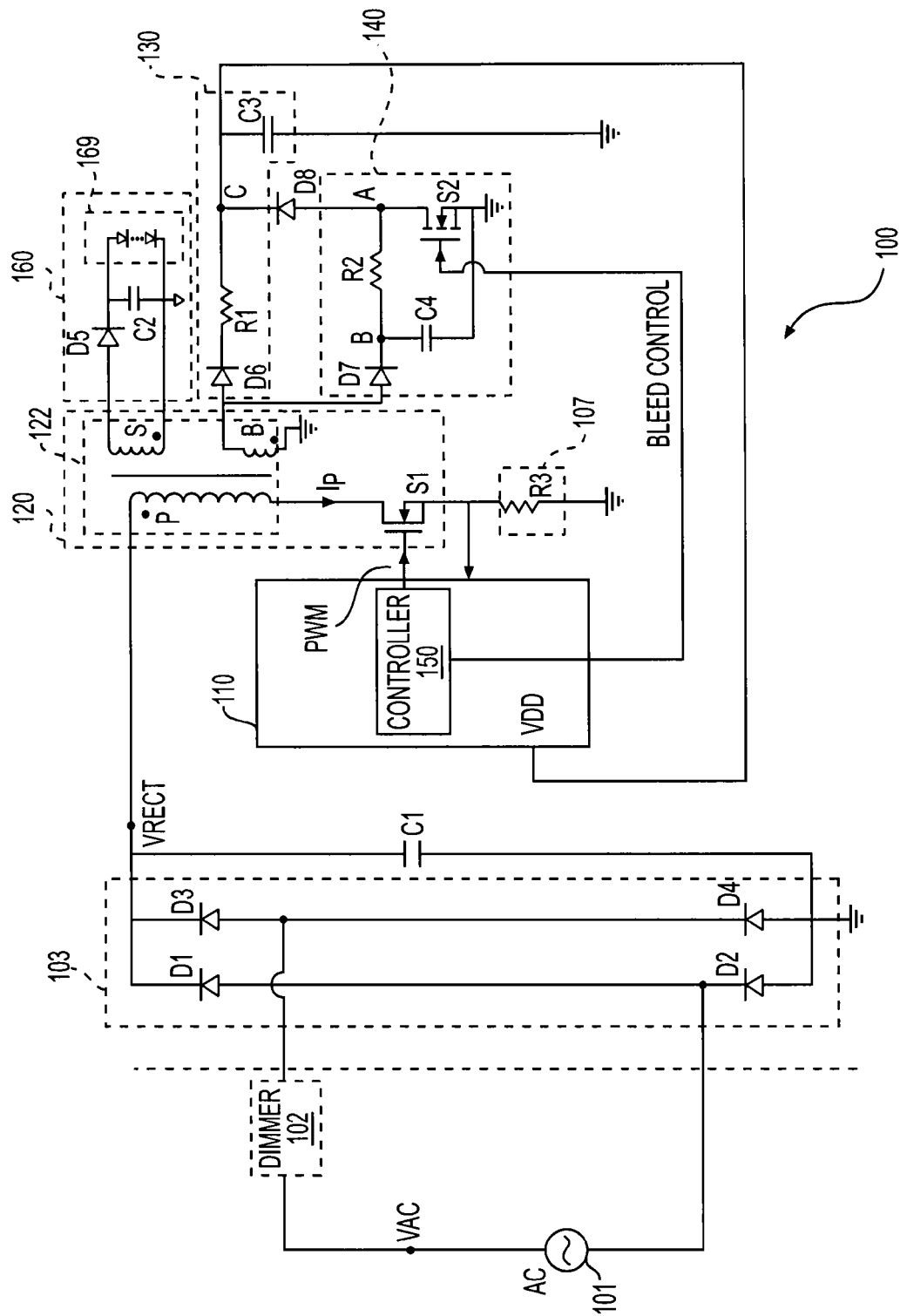
FIG. 1 shows a block diagram of an electronic system 100 according to an embodiment of the disclosure.

FIG. 1 shows a block diagram of an electronic system 100 according to an embodiment of the disclosure. The electronic system 100 operates based on an alternating current (AC) voltage $V_{AC}$ provided by an AC power supply 101 with or without a dimmer 102. The AC power supply 101 can be any suitable AC power supply, such as 60 Hz 110V AC power supply, 50 Hz 220V AC power supply, and the like.

The electronic system 100 includes a switchable bleeder circuit 140 configured to be switched on at specific time to bleed away a portion of the energy from the power supply, for example, to enable the dimmer 102 to properly operate when the dimmer 102 exists. Further, when the bleeder circuit 140 is switched off, the electronic system 100 is configured to avoid excessive charge accumulation on the bleeder circuit 140. For example, the electronic system 100 is configured to enable charges accumulated on the bleeder circuit 140 to be able to flow to another portion of the electronic system 100, such as a charging circuit 130 and the like, via a bridge circuit, such as a diode D8 that bridges the bleeder circuit 140 with the charging circuit 130 of the electric system 100.

According to an aspect of the disclosure, the electronic system 100 is operable under various dimming characteristic of the power supply. In an example, a power supply may have a pre-installed phase-cut dimmer 102, such as a triode for alternating current (TRIAC) type dimmer having an adjustable dimming angle α. The dimming angle α defines a size of a phase-cut range during which the TRIAC is turned off. Further, a phase range that is out of the phase-cut range can be referred to as a conduction angle during which the TRIAC is turned on. During an AC cycle, when the phase of the AC voltage $V_{AC}$ is in the phase-cut range, the TRIAC is turned off. Thus, an output voltage of the dimmer 102 is about zero. When the phase of the AC voltage $V_{AC}$ is out of the phase-cut range (e.g., in the conduction angle), the TRIAC is turned on. Thus, the output voltage of the dimmer 102 is about the same as the AC voltage $V_{AC}$. The phase-cut dimmer 102 can be a leading edge TRIAC, a trailing edge TRIAC, or other types of dimmer.

Generally, the TRIAC type dimmer 102 requires a holding current, such as in a range of 8 to 40 mA, and the like, to remain the current conduction during the conduction angle. In an example, when a current draw from the TRIAC type dimmer 102 during the conduction angle is lower than the holding current, such as in a deep dimming situation, the TRIAC within the dimmer 102 may be prematurely turned off, which may cause flicking and shimmering by a light device and cause unpleasant user experience. According to an embodiment of the disclosure, the bleeder circuit 140 is suitable turned on to maintain the current draw from the TRIAC type dimmer 102 to be above the holding current to avoid the premature turn-off, such that the user experience can be improved.

However, when the power supply does not have any pre-installed dimmer, in an embodiment, the electronic system 100 is configured to improve energy efficiency. In an example, the electronic system 100 is configured to perform power factor correction (PFC) and total harmonic distortion (THD) reduction to improve energy efficiency. To improve energy efficiency, in an example, the bleeder circuit 140 is maintained in an off state to avoid energy bleeding. However, charges may be accumulated in the bleeder circuit 140. The diode D8 enables the accumulated charges to be able to flow to the charging circuit 130, and to achieve various benefits, such as charge balance, fast charging, voltage spike clamping, device protection, and the like.

Specifically, in the FIG. 1 example, the electronic system 100 includes a rectifier 103, a control circuit 110, an energy transfer module 120, a current sensor 107, the charging circuit 130, the bleeder circuit 140, the diode D8, and an output circuit 160. These elements are coupled together as shown in FIG. 1.

The rectifier 103 rectifies an AC voltage to a fixed polarity, such as to be positive. In the FIG. 1 example, the rectifier 103 is a bridge rectifier. The bridge rectifier 103 receives the AC voltage, or the output voltage of the dimmer 102, and rectifies the received voltage to a fixed polarity, such as to be positive. In the FIG. 1 example, the electronic system 100 includes a capacitor C1 to remove high frequency noise in the rectified voltage $V_{RECT}$. The rectified voltage $V_{RECT}$ is provided to the following circuits, such as the control circuit 110, the energy transfer module 120, and the like, in the electronic system 100.

The energy transfer module 120 transfers electric energy provided by the rectified voltage $V_{RECT}$ to a plurality of circuits, such as the output circuit 160, the charging circuit 130, the bleeder circuit 140, and the like, under the control of the control circuit 110. In an embodiment, the energy transfer module 120 is configured to use a magnetic component, such as a transformer, an inductor, and the like to transfer the electric energy. The energy transfer module 120 can have any suitable topology, such as a fly-back topology, a buck-boost topology, and the like. In the FIG. 1 example, the energy transfer module 120 includes a transformer 122 and a switch S1. The transformer 122 includes a primary winding (P) coupled with the switch S1 to receive the rectified voltage $V_{RECT}$, a first secondary winding (S) coupled to the output circuit 160 to drive the output circuit 160, and a second secondary winding (bias winding B) coupled with the charging circuit 130 and the bleeder circuit 140. It is noted that the energy transfer module 120 can be suitably modified to use one or more inductors to transfer the electric energy.

The current sensor 107 is configured to sense a current $I_P$ flowing through the primary winding, and provide the sensed current to the control circuit 110. In an example, the current sensor 107 includes a resistor R3 having a relatively small resistance such that a voltage drop on the resistor is small compared to the rectified voltage $V_{RECT}$. The voltage drop is indicative of the current $I_P$. In an example, the voltage drop is provided to the control circuit 110 as the sensed current.

The output circuit 160 includes a diode D5, a capacitor C2, and a load device 169. These elements are coupled together as shown in FIG. 1. The load device 169 can be any suitable device, such as a lighting device, a fan and the like. In an embodiment, the load device 169 includes a plurality of light emitting diodes (LEDs). The load device 169 and the other components of the electronic system 100 are assembled into a package to form an LED lighting device to replace, for example, a fluorescent lamp, a halogen lamp, and the like.

The charging circuit 130 includes a diode D6, a resistor R1 and a capacitor C3 coupled together as shown in FIG. 1. In an embodiment, the capacitor C3 is relatively large, such as in the order of 10 µF or above. The capacitor C3 is configured to store charge energy, and provides a supply voltage, such as VDD, for the control circuit 110.

The bleeder circuit 140 includes a diode D7, a resistor R2, and a switch S2 coupled together as shown in FIG. 1. In an example, the bleeder circuit 140 includes a capacitor C4 having a relatively small capacitance, such as in the order of nF. The capacitor C4 is used as a high frequency filter. In another example, the bleeder circuit 140 does not include the capacitor C4. The bleeder circuit 140 can be switched on and switched off. In the FIG. 1 example, the switch S2 is implemented as a transistor. When the transistor is turned on to conduct current, the bleeder circuit 140 is switched on, and a current flows through the resistor R2 to bleed away electrical energy, such as convert electrical energy to thermal heat. When the transistor is turned off to stop conducting current, the bleeder circuit 140 is switched off.

In the FIG. 1 example, the bridge circuit is implemented as the diode D8 that couples a node A in the bleeder circuit 140 with a node C in the charging circuit 130. In another embodiment, the bridge circuit is implemented as a diode that couples a node B in the bleeder circuit 140 with the node C in the charging circuit 130. It is noted that the bridge circuit can be implemented by other suitable circuit component. In an example, the bridge circuit is implemented using one or more transistors. The transistors are controlled to provide the charge flow path when the bleeder circuit 140 is switched off.

According to an embodiment of the disclosure, the control circuit 110 includes any suitable circuits, such as a detecting circuit (not shown), a controller 150, and the like. In an example, the detecting circuit includes various signal processing circuits, such as analog signal processing circuit, digital signal processing circuit and the like to detect various parameters, such as the dimming characteristic, the dimming angle, the current $I_P$ flowing through the switch S1, and the like. In an example, the detecting circuit monitors the input voltage, such as the rectified voltage $V_{RECT}$, and detects a time duration in a half AC cycle when the TRIAC in the dimmer 102 has been turned off, and calculates a percentage of time duration to the half AC cycle. The percentage can be used to indicate the dimming characteristic of the power supply. For example, when the percentage is about 0%, the power supply has a zero-dimming characteristic. When the percentage is smaller than a threshold, such as 25%, the power supply has a low-dimming characteristic. When the percentage is larger than a threshold, such as 75%, the power supply has a deep-dimming characteristic.

The controller 150 generates various control signals to control the operations in the electronic system 100. In an example, the controller 150 provides a pulse width modulation (PWM) signal with pulses having a relatively high frequency, such as in the order of 100 KHz, and the like, to control the switch S1 to transfer the electric energy from the primary winding to the secondary windings in the transformer 122.

Specifically, in an example, when the switch 51 is switched on, a current $I_P$ flows through the primary winding of the transformer 122, and the switch S1. The polarity of the transformer 122 and the direction of the diodes D5, D6 and D7 can be arranged such that there is no current in the secondary windings S and B when the switch S1 is switched on. Thus, the received electric energy is stored in the transformer 122.

When the switch S1 is switched off, the current $I_P$ becomes zero. The polarity of the transformer 122 and the direction of the diodes D5, D6 and D7 can enable the secondary windings S and B to deliver the stored electric energy to the output device 160, the charging circuit 130 and the bleeder circuit 140.

Further, in an embodiment, the controller 150 provides a bleed control signal to the switch S2 to control the operations of the switch S2 to turn on or turn off the bleeder circuit 140.

According to an aspect of the disclosure, the controller 150 generates the bleed control signal to switch on and off the bleeder circuit 140 based on the dimming characteristic of the power supply. In an example, when the power supply has the zero-dimming characteristic or the low-dimming characteristic, the controller 150 generates the bleed control signal to switch off the bleeder circuit 140. When the dimming angle of the power supply increases, a current drawn from the power supply to drive the load device is reduced responsively for the dimming function. When the power supply is in the deep dimming characteristic, the current needed to drive the load device for the dimming function can be lower than the holding current for the dimmer 102. Then, the controller 150 generates the bleed control signal to suitably switch on the bleeder circuit 140, such as during a time window, to draw additional current from the power supply and thus the total current drawn from the power supply can satisfy the holding current requirement for the dimmer 102 during the conduction angle to avoid the premature TRIAC turn-off.

When the bleeder circuit 140 is switched off, charges may accumulate on the bleeder circuit 140, and raise a voltage, such as a voltage at the node A. When the voltage at the node A is large enough to case the diode D8 to be forward-biased, charges can flow through the diode D8. According to an aspect of the disclosure, the charges flowing through the diode D8 can be stored by the capacitor C3, and thus the capacitor C3 can be charged faster. In addition, the voltage on the node A is clamped at a voltage, such as about a forward-bias voltage of the diode D8 above the voltage at the node C, and thus devices in the bleeder circuit 140 can be protected. In an example, the switch S2 is implemented using a technology that has a relatively low breakdown voltage, such as about 30V, and the like. When the voltage at the node A is higher than the breakdown voltage, the switch S2 can be damaged. The existence of the diode D8 can clamp the voltage at the node A below 20V when the voltage on the node C is about 18V, and thus can protect the switch S2.

During operation, in an example, when the detecting circuit in the control circuit 110 detects that the dimmer 102 exists and is configured in a deep-dimming characteristic, the controller 150 provides suitable PWM signal to the switch S1 to control the energy transfer module 120 to draw from the power supply a current that is above the holding current for the dimmer 102 to avoid premature turn off. Further, the controller 150 provides the bleed control signal to the switch S2 to turn on the switch S2 during a time duration in each half AC cycle. When the switch S2 is turned on, the resistor R2 conducts current and bleeds away a portion of the electric energy from the total electric energy transferred by the energy transfer module 120, thus the electric energy provided to the output device 169 satisfies the deep-dimming characteristic.

In an example, when the dimmer 102 is adjusted to increase the dimming angle, the switch S2 is controlled to turn on for a longer time duration to bleed away more electric energy in order to dim the output device 169.

In an example, when the switch S2 is turned on, if the voltage at the node A can be kept relatively low, such as lower than the voltage at node C, thus the diode D8 is reverse-biased and does not conduct current.

When the detecting circuit in the control circuit 110 detecting detects that the power supply is in a zero-dimming characteristic or a low-dimming characteristic, the controller 150 provides suitable PWM signal to the switch S1 to control the energy transfer module 120 to transfer the electric energy. Further, the controller 150 provides the bleed control signal to the switch S2 to turn off the switch S2 and switch off the bleeder circuit 140. In an example, when the dimmer 102 is adjusted to increase the dimming angle in the low-dimming characteristic, the PWM signal is adjusted in order to dim the output device 169.

When the switch S2 is turned off, charges may accumulate in the bleeder circuit 140. In addition, the bleeder circuit 140 may suffer from voltage spike that can damage circuit component. According to an aspect of the disclosure, in the FIG. 1 example, when the voltage at the node A is higher than the voltage at node C by a forward-bias voltage of the diode D8, the diode D8 is forward-biased, and starts conducting current. Then, charges in the charging circuit 130 and the bleeder circuit 140 can be balanced, and the current from the bleeder circuit 140 to the charging circuit 130 can additionally charge the capacitor C3 to make the capacitor C3 charge faster. In addition, when the voltage at the node A increases, the current from the bleeder circuit 140 to the charging circuit 130 increases to lower the voltage at the node A, thus the voltage on the node A is clamped, for example, at above the voltage at the node C by the forward-bias voltage. Because the voltage in the bleeder circuit 140 is clamped to a relatively low voltage, the circuit components in the bleeder circuit 140 can be protected.

It is noted that the electronic system 100 can be implemented using one or more integrated circuit (IC) chips. In an example, the control circuit 110 is implemented as a single IC chip, the switch S1 and switch S2 can be implemented on another IC chip, or can be implemented as discrete components. In another example, the switches S1 and S2 can be integrated with the control circuit 110 on the same IC chip.

Figure 2:
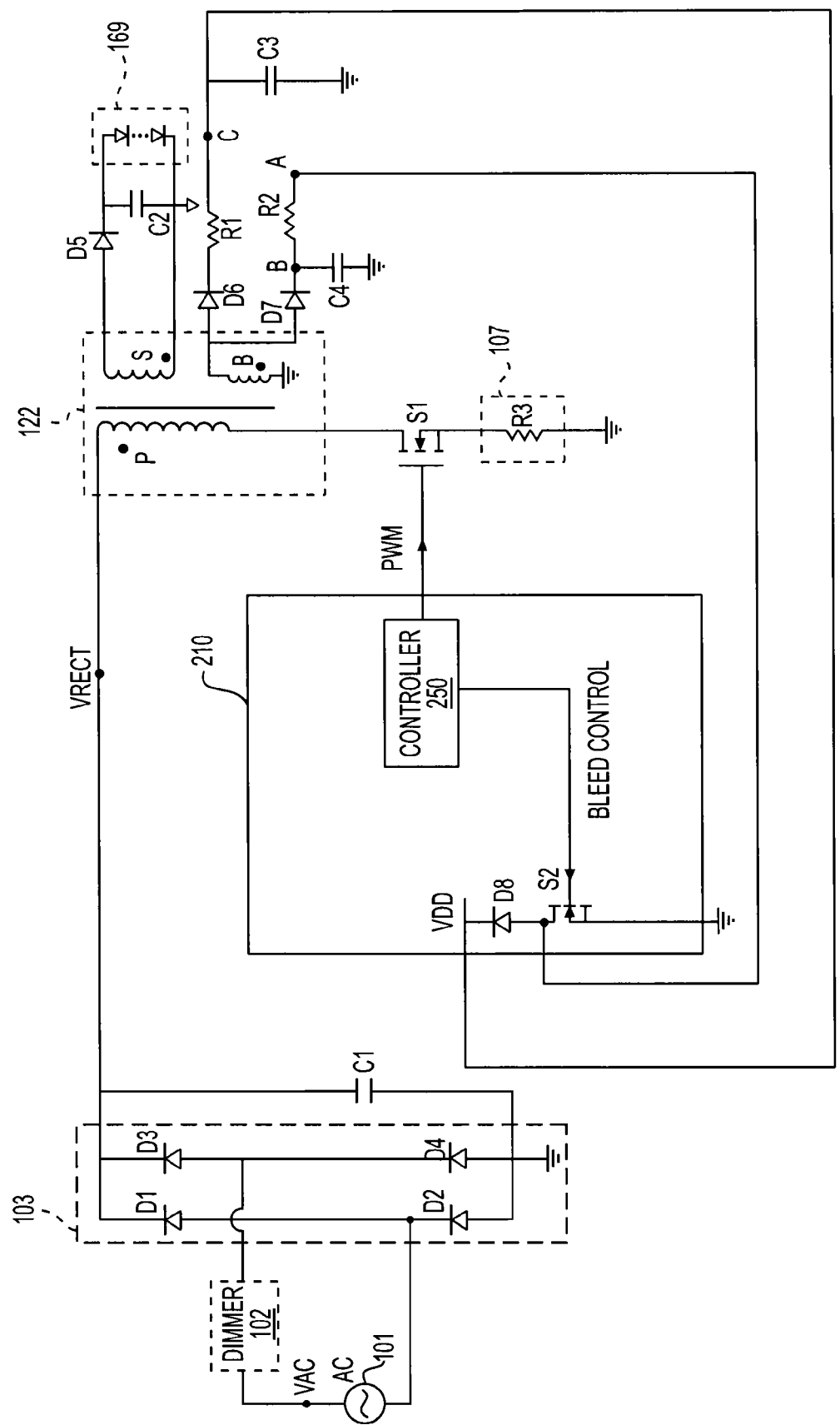
FIG. 2 shows a block diagram of another electronic system 200 according to an embodiment of the disclosure.

FIG. 2 shows an electronic system 200 according to an embodiment of the disclosure. The electronic system 200 operates similarly to the electronic system 100 described above. The electronic system 200 also utilizes certain components that are identical or equivalent to those used in the electronic system 100; the description of these components has been provided above and will be omitted here for clarity purposes. However, in the FIG. 2 example, the switch S2 and the diode D8 are integrated with the control circuit 210 on the same IC chip, and the switch S1 is implemented as an external component of the IC chip.

Figure 3:
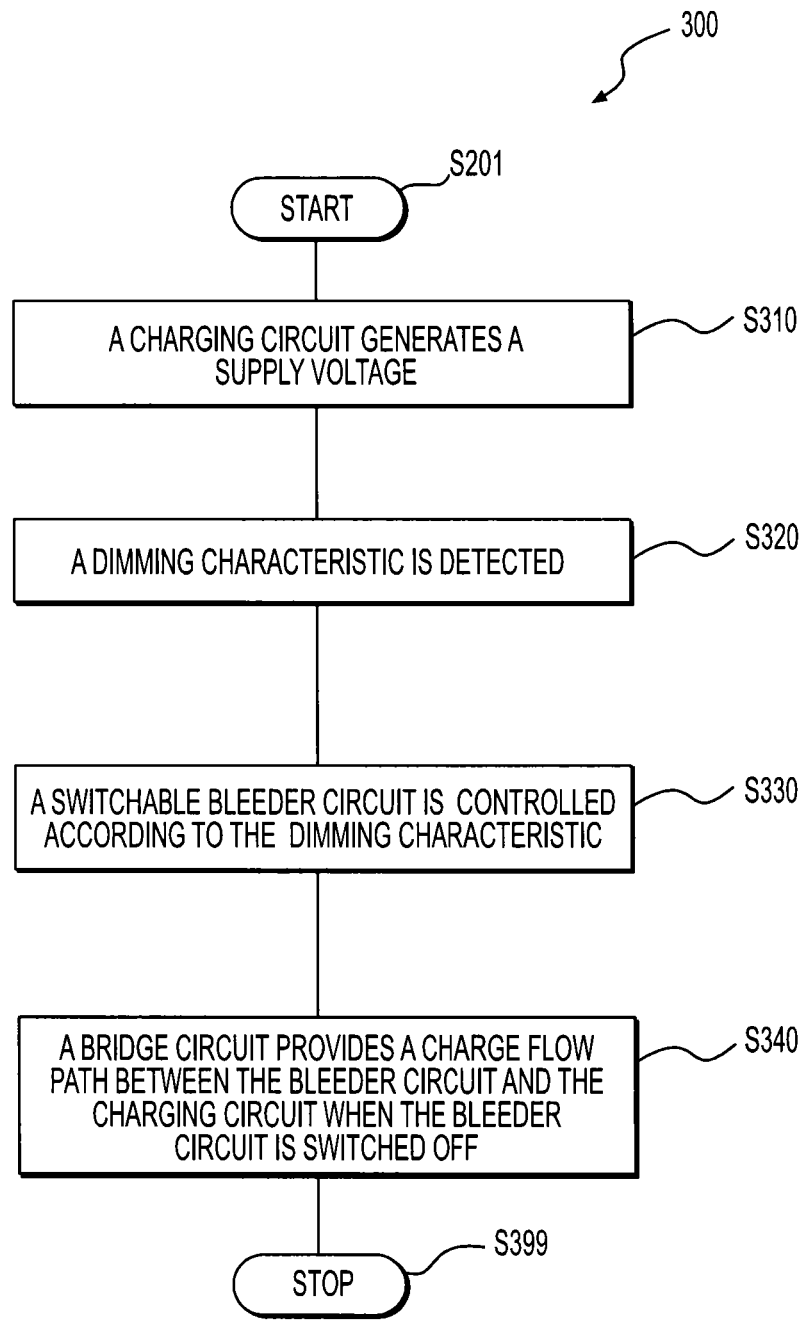
FIG. 3 shows a flow chart outlining a process example 300 according to an embodiment of the disclosure.

FIG. 3 shows a flowchart outlining a process example 300 according to an embodiment of the disclosure. The process is executed by an electronic system that includes a switchable bleeder circuit and a bridge circuit which provides a charge flow path to avoid excessive charge accumulation in the bleeder circuit when the bleeder circuit is switched off. In an example, the process is executed by the electronic system 100. The process starts at S301 and proceeds to S310.

At S310, a charging circuit in the electronic system stores charges and generates a supply voltage. In the FIG. 1 example, the charging circuit 130 is coupled to the bias winding (B) of the transformer 122 to receive electric energy, store the electric energy in the capacitor C3 having a relatively large capacitance, and generates and provides a supply voltage VDD to the control circuit 110.

At S320, a dimming characteristic of the power supply is detected. In the FIG. 1 example, the detecting circuit in the control circuit 110 detects the dimming characteristic, such as a dimming angle, a dimming percentage, and the like, of the power supply.

At S330, a switchable bleeder circuit is controlled according to the dimming characteristic. In the FIG. 1 example, the controller 150 provides the PWM signal to the first switch S1 to control the energy transfer and provides the bleed control signal to the second switch S2 to control the energy bleeding according to the dimming characteristic of the power supply. For example, when the power supply does not have the dimmer 102 or the dimming angle is zero, the controller 150 generates and provides the suitable PWM control signal to the switch S1 to transfer electric energy to the output circuit 160, and generates and provides the bleed control signal to the switch S2 to switch off the bleeder circuit 140. In an example, the PWM control signal is generated to perform power factor correction (PFC) and total harmonic distortion (THD) reduction to improve energy efficiency.

When the dimmer 102 exists, and is adjusted to have the low-dimming characteristic, in an example, the controller 150 generates and provides the PWM signal to the first switch S1 to transfer electric energy to the output circuit 160, and generates and provides the bleed control signal to the switch S2 to switch off the bleeder circuit 140. In the example, parameters for the PWM signal are determined according to the dimming characteristic to perform the dimming function.

Further, when the dimmer 102 exists, and is adjusted to have the deep-dimming characteristic, the controller 150 generates and provides the PWM signal to the first switch S1 to transfer electric energy to the circuits coupled to the secondary windings, and provides and generates the bleed control signal to the switch S2 to suitably turn on the bleeder circuit 140. In an example, the parameters for the PWM signal are determined to draw enough current from the dimmer 102 during the conduction angle to avoid pre-mature TRIAC turn-off. Further, the parameters of the bleed control signal, such as a turn-on time and the like, are determined based on the deep-dimming characteristic to bleed away a portion of the electric energy in order to reduce the electric energy driven to the output device 160, and thus the output device 160 is dimmed according to the deep-dimming characteristic.

At S340, a bridge circuit provides a charge flow path between the bleeder circuit and the charging circuit when the bleeder circuit is switched off. In the FIG. 1 example, when the bleeder circuit 140 is turned off, charges may flow to the bleeder circuit 140 and are accumulate in the bleeder circuit 140. The accumulated charges can raise the voltage at the node A for example. When the voltage on the node A is larger than the voltage on the node C by a diode forward-bias voltage, the diode D8 starts conducting current and can achieve various benefits, such as charge balance, fast charging, voltage-clamping, device protection, and the like. Then the process proceeds to S399 and terminates.

According to a circuit simulation, the charging circuit 130 is configured to generate and provide the supply voltage VDD at about 18.690V. Because of the diode D8, the voltage at the node A is clamped at a relatively low voltage, such as about 19.054V, when the switch S2 is turned off. However, when the diode D8 does not exist, the voltage at the node A can raise to very high, such as 74.32 V according to the circuit simulation, and may damage circuit components, such as the switch S2.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A circuit, comprising:
a first circuit coupled to a magnetic component to receive electric energy transferred via the magnetic component and configured to store the electric energy and generate a supply voltage;
a second circuit coupled to the magnetic component, the second circuit being switchable and configured to deplete a portion of the electric energy when the second circuit is switched on;
a bridge circuit coupled between the first circuit and the second circuit to provide a charge flow path when the second circuit is switched off.

2. The circuit of claim 1, wherein the bridge circuit comprises a diode coupled between the first circuit and the second circuit to clamp a voltage on the second circuit.

3. The circuit of claim 1, wherein the first circuit comprises a capacitive component to store the electric energy and generate the supply voltage for a control circuit.

4. The circuit of claim 3, wherein a capacitance of the capacitive component is about 10 µF or above.

5. The circuit of claim 1, wherein the second circuit includes a switch component.

6. The circuit of claim 1, wherein the first circuit and the second circuit are coupled to a secondary winding of a transformer, the transformer transfers the electric energy from an AC power supply coupled to a primary winding of the transformer.

7. The circuit of claim 6, further comprising:
a third circuit coupled to another secondary winding of the transformer to receive the electric energy and drive a load device.

8. A method, comprising:
receiving and storing, by a first circuit coupled with a magnetic component, electric energy transferred via the magnetic component;
depleting, by a second circuit coupled with the magnetic component, a portion of the electric energy when the second circuit is switched on; and
providing a charge flow path between the first circuit and the second circuit when the second circuit is switched off.

9. The method of claim 8, wherein providing the charge flow path between the first circuit and the second circuit when the second circuit is switched off further comprises:
clamping a voltage on the second circuit by using a diode coupled between the first circuit and the second circuit.

10. The method of claim 8, wherein receiving and storing, by the first circuit coupled with the magnetic component, the electric energy transferred via the magnetic component further comprises:
storing the electric energy in a capacitive component to generate a supply voltage; and
providing the supply voltage to a control circuit.

11. The method of claim 8, further comprising:
controlling a switch in the second circuit to switch on and switch off the second circuit.

12. The method of claim 8, further comprising:
controlling a switch coupled to a primary winding of a transformer to transfer the electric energy from a power supply to a secondary winding of the transformer that is coupled with the first circuit and the second circuit.

13. The method of claim 12, further comprising:
receiving the electric energy, by a third circuit coupled to another secondary winding of the transformer to drive a load device.

14. An apparatus, comprising:
a magnetic component configured to transfer electric energy from an energy source to circuits in the apparatus;
an output circuit coupled to the magnetic component to receive the electric energy and drive an output device;
a first circuit coupled to the magnetic component to receive and store the electric energy;
a second circuit coupled to the magnetic component to deplete a portion of the electric energy when the second circuit is switched on; and
a bridge circuit coupled between the first circuit and the second circuit to provide a charge flow path when the second receiving circuit is switched off.

15. The apparatus of claim 14, wherein the bridge circuit comprises a diode coupled between the first circuit and the second circuit to clamp a voltage on the second circuit.

16. The apparatus of claim 14, wherein the first circuit comprises a capacitive component to store the electric energy and provide a supply voltage to a control circuit.

17. The apparatus of claim 16, wherein a capacitance of the capacitive component is about 10 µf or above.

18. The apparatus of claim 14, wherein the second circuit includes a switch component.

19. The apparatus of claim 14, wherein the first circuit and the second circuit are coupled to a secondary winding of a transformer that transfers the electric energy from an AC power supply that is coupled to a primary winding of the transformer.

20. The apparatus of claim 19, wherein:
the output circuit is coupled to another secondary winding of the transformer to receive the electric energy and drive the output device.

* * * * *